United States Patent
Hsiao et al.

(10) Patent No.: US 7,572,413 B2
(45) Date of Patent: Aug. 11, 2009

(54) APPARATUS FOR MANUFACTURING CARBON NANOTUBES

(75) Inventors: Bor-Yuan Hsiao, Tu-Cheng (TW); Ching-Chou Chang, Tu-Cheng (TW); Chi-Chuang Ho, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 425 days.

(21) Appl. No.: 11/309,321

(22) Filed: Jul. 26, 2006

(65) Prior Publication Data
US 2007/0237694 A1    Oct. 11, 2007

(51) Int. Cl.
B01J 19/00    (2006.01)
C09C 3/00    (2006.01)
D01F 9/12    (2006.01)
B01J 8/08    (2006.01)

(52) U.S. Cl. .................. 422/129; 422/150; 422/151; 422/152; 422/198; 422/199; 422/232; 423/447.2; 423/447.3

(58) Field of Classification Search ............... 422/129, 422/150, 151, 152, 198, 199, 232; 423/447.2, 423/447.3
See application file for complete search history.

(56) References Cited

U.S. PATENT DOCUMENTS

| | | | | |
|---|---|---|---|---|
| 5,002,630 | A * | 3/1991 | Kermani et al. | 117/88 |
| 5,010,842 | A * | 4/1991 | Oda et al. | 118/723 ME |
| 6,565,984 | B1 * | 5/2003 | Wu et al. | 428/472.2 |
| 6,713,188 | B2 * | 3/2004 | Wu et al. | 428/472.2 |
| 6,800,369 | B2 * | 10/2004 | Gimzewski et al. | 428/408 |
| 7,033,650 | B2 * | 4/2006 | Mauthner et al. | 427/590 |
| 7,037,846 | B2 * | 5/2006 | Srivastava et al. | 438/710 |
| 2002/0045362 | A1 * | 4/2002 | Yang et al. | 438/791 |
| 2002/0102353 | A1 * | 8/2002 | Mauthner et al. | 427/255.28 |
| 2003/0032292 | A1 * | 2/2003 | Noguchi | 438/692 |
| 2003/0064169 | A1 * | 4/2003 | Hong et al. | 427/569 |
| 2003/0224188 | A1 * | 12/2003 | Wu et al. | 428/472.2 |
| 2005/0247567 | A1 * | 11/2005 | Akram et al. | 205/145 |
| 2007/0110659 | A1 * | 5/2007 | Hsiao | 423/447.3 |
| 2007/0144887 | A1 * | 6/2007 | Chang et al. | 204/173 |
| 2007/0264187 | A1 * | 11/2007 | Harutyunyan et al. | 423/447.3 |

OTHER PUBLICATIONS

Shoushan, Fan et.at, Monitoring the growth of the carbon nanotubes by carbon isotope labelling Nanotechnology 14(2003)1118-1123.

* cited by examiner

*Primary Examiner*—Walter D Griffin
*Assistant Examiner*—Huy-Tram Nguyen
(74) *Attorney, Agent, or Firm*—Clifford O. Chi

(57) ABSTRACT

An apparatus for manufacturing carbon nanotubes is provided. The apparatus includes: a reaction chamber having an inlet and a outlet; a heater for elevating an interior temperature of the reaction chamber; and a gas guiding member coupled to the inlet and configured for introducing a carbon-containing gas into the reaction chamber, the gas guiding member including a gas-exiting portion arranged in the reaction chamber, the gas-exiting portion having a cavity defined therein and a flat perforated top wall, the perforated top wall being configured for supporting a substrate thereon and defining a route allowing the introduced carbon-containing gas to flow in a direction substantially perpendicular to a main plane of the substrate.

11 Claims, 6 Drawing Sheets

APPARATUS FOR MANUFACTURING CARBON NANOTUBES

TECHNICAL FIELD

The present invention relates to carbon nanotubes and, more particularly to an apparatus for manufacturing carbon nanotubes by chemical vapor deposition (CVD).

DISCUSSION OF RELATED ART

Generally, carbon nanotubes can be manufactured by methods including resistance heating, plasma discharge such as arc discharge with a carbon rod as a raw material, laser ablation, and chemical vapor deposition using acetylene gas.

Chemical vapor deposition is a method of generating carbon nanotubes by a chemical decomposition reaction of the carbon-containing gas, using acetylene gas, methane gas, or the like containing carbon as a raw material. The chemical vapor deposition depends on a chemical reaction occurring in the carbon-source gas as part of a thermal decomposition process, thereby enabling the manufacture of high-purity carbon nanotubes. As shown in FIG. 4, a typical CVD apparatus 10 includes a horizontally disposed quartz tube 30 and a substrate 20 disposed in the quartz tube 30, upon which nanotubes can be grown. The quartz tube 30 has an inlet 32 and an outlet 34 positioned opposite to the inlet 32. The substrate 20 has a catalyst layer 22 formed on a top surface thereof. During nanotube growth, a flow of carbon-containing gas is horizontally provided to move along and inside the quartz tube 30, thereby bringing carbon elements contained in the gas to the substrate 20.

However, carbon nanotubes formed by the above-mentioned apparatus have shortcomings. During the manufacturing process, the direction of the gas flow is substantially parallel to the surface of the catalyst layer, while the nanotubes grow upwardly perpendicular to the catalyst layer 22. As such, although rather slow, the horizontal movement of the flow disturbs the growing process of the nanotubes and alters the vertical alignment of the carbon nanotubes.

Therefore, what is needed is an apparatus capable of manufacturing vertically aligned carbon nanotubes.

SUMMARY

Accoring to an exemplary embodiment, an apparatus for manufacturing carbon nanotubes includes: a reaction chamber having an inlet and an outlet; a heater for elevating an interior temperature of the reaction chamber; and a gas guiding member coupled to the inlet and configured for introducing a carbon-containing gas into the reaction chamber, the gas guiding member including a gas-exiting portion arranged in the reaction chamber, the gas-exiting portion having a cavity defined therein and a flat perforated top wall, the perforated top wall being configured for supporting a substrate thereon and defining a route allowing the introduced carbon-containing gas to flow in a direction substantially perpendicular to a main plane of the substrate.

Detailed features of the present carbon nanotubes manufacturing apparatus will become more apparent from the following detailed description and claims, and the accompanying drawings.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus and method. Moreover, in the drawings, like reference numerals designate corresponding parts throughout the several views, wherein.

DETAILED DESCRIPTION OF THE INVENTION

Reference will now be made to the drawings to describe the preferred embodiments of the present apparatus for manufacturing carbon nanotubes, in detail.

Figure 1:
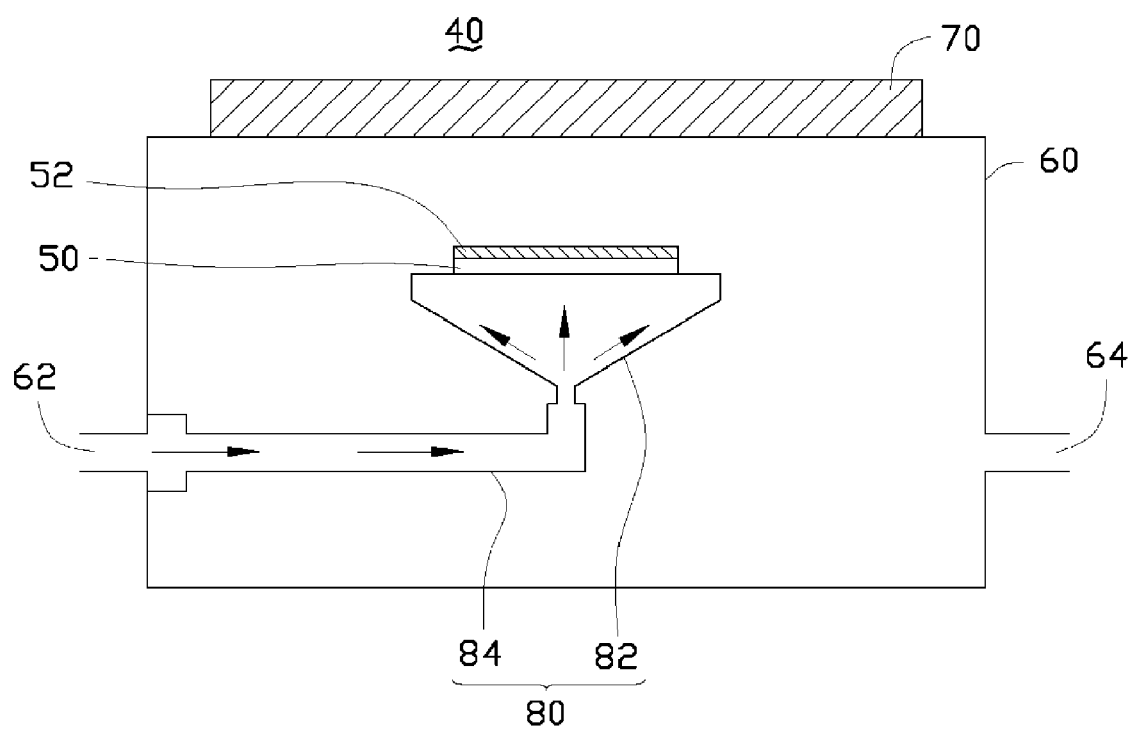
FIG. 1 is a schematic cross-sectional view of an apparatus for manufacturing carbon nanotubes according to a first exemplary embodiment.

Referring now particularly to FIG. 1, where an apparatus 40 for manufacturing carbon nanotubes according to a first embodiment of the present invention is shown. The apparatus 40 mainly includes a reaction chamber 60, a heater 70 and a gas guiding member 80. The heater 70 is configured for heating the interior of the reaction chamber 60. The gas guiding member 80 is received in the reaction chamber 60. A substrate 50 is disposed on a top of the gas guiding member 80.

The substrate 50 is configured for growing carbon nanotubes, and includes a top surface and a bottom surface. The substrate 50 has a catalyst layer 52 formed on and in contact with the top surface thereof. The substrate 50 is made of a material selected from a group consisting of quartz, silicon, and magnesium oxide. The material of the catalyst layer 52 is selected from a group consisting of cobalt, nickel, iron, and any appropriate alloy of them.

The reaction chamber 60 is a cubic chamber that has an inlet 62 and an outlet 64. The inlet 62 is defined on a sidewall of the reaction chamber 60. The outlet 64 is defined on another sidewall of reaction chamber 60 spatially opposite to the inlet 62.

The heater 70 can be any type of heating device that is adapted for heating the reaction chamber 60, for example a high temperature furnace or a high frequency induction heating furnace can be used.

Figure 2A:
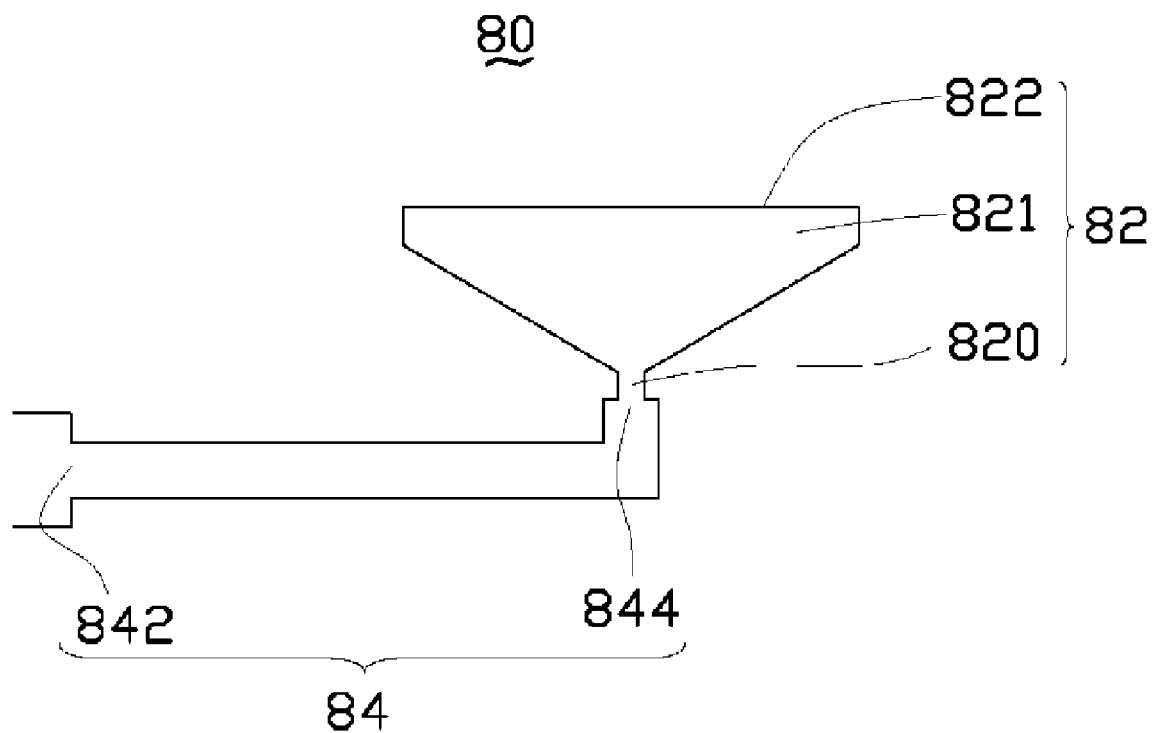
FIG. 2A is a schematic cross-sectional view of a conical gas guiding member of the apparatus illustrated in FIG. 1.
Figure 2B:
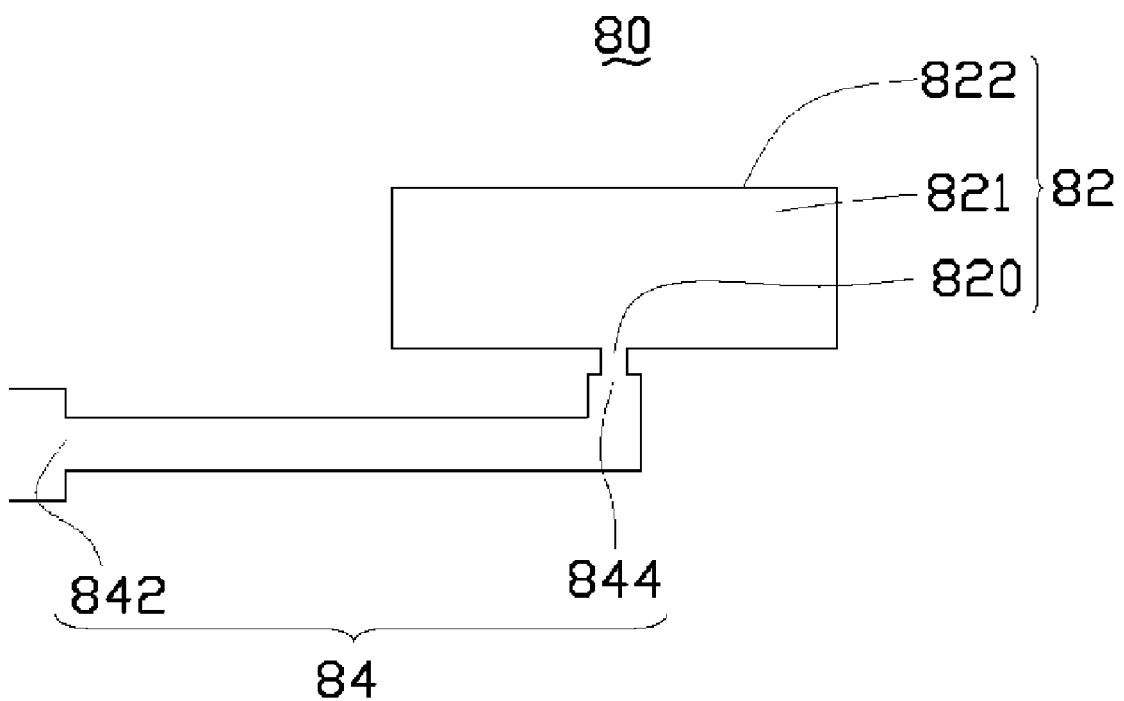
FIG. 2B is a schematic cross-sectional view of a cylindrical gas guiding member of an apparatus for manufacturing carbon nanotubes according to a second embodiment.
Figure 2C:
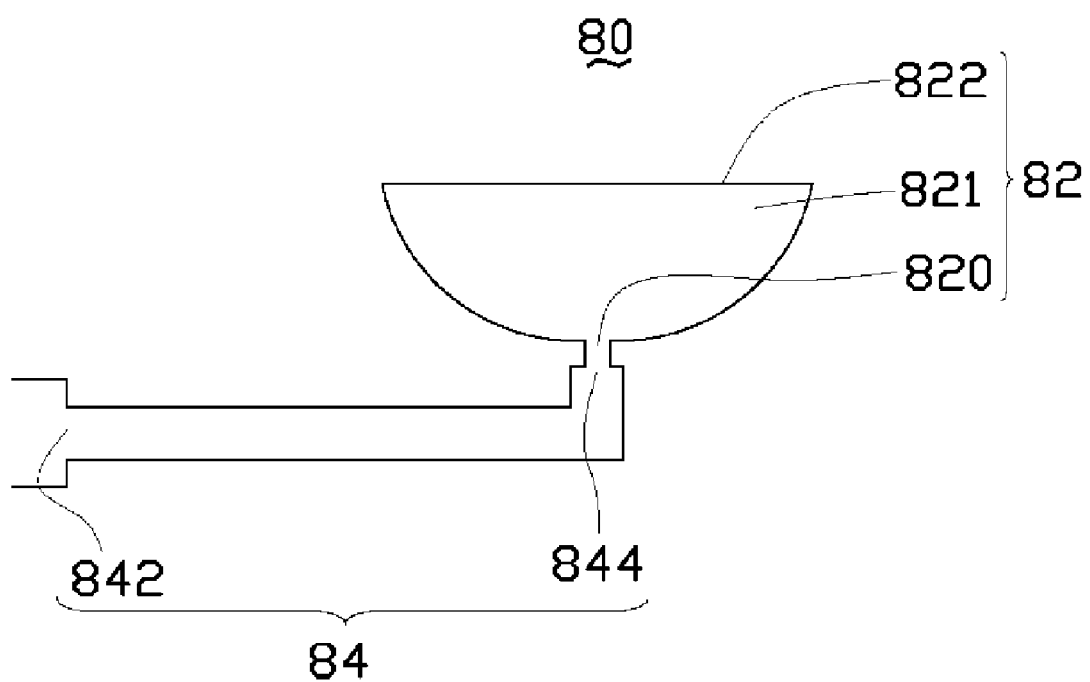
FIG. 2C is a schematic cross-sectional view of a hemispherical gas guiding member of an apparatus for manufacturing carbon nanotubes according to a third embodiment.
Figure 3:
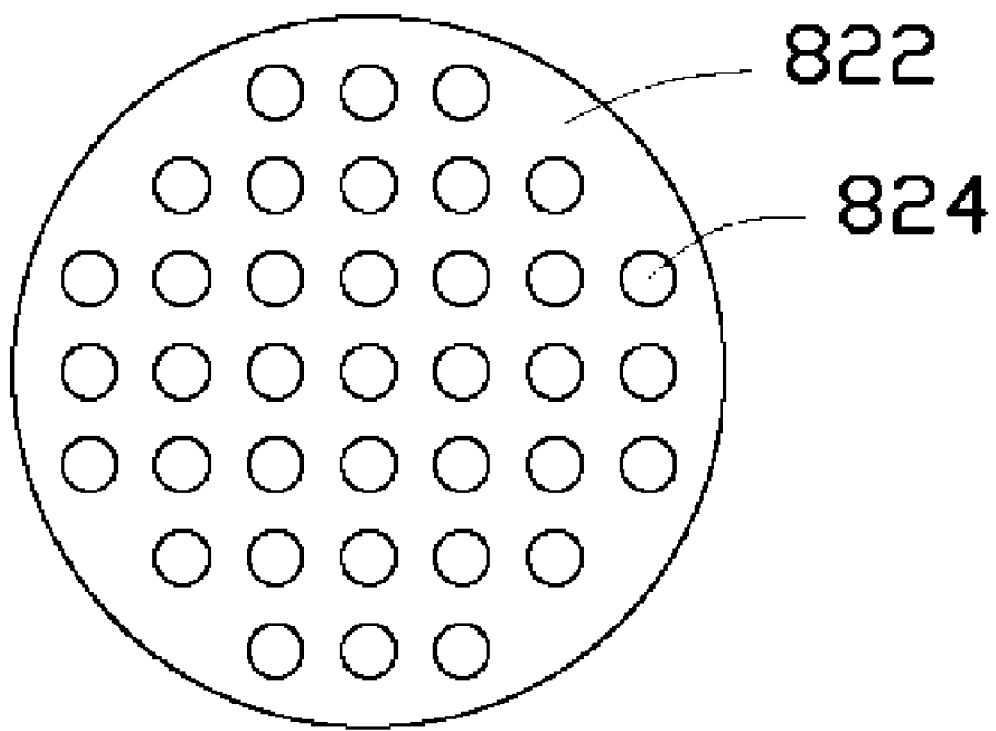
FIG. 3 is a top view of a perforated wall of the gas-exiting portion of the gas guiding members of the apparatus illustrated in FIG. 1.
Figure 4:
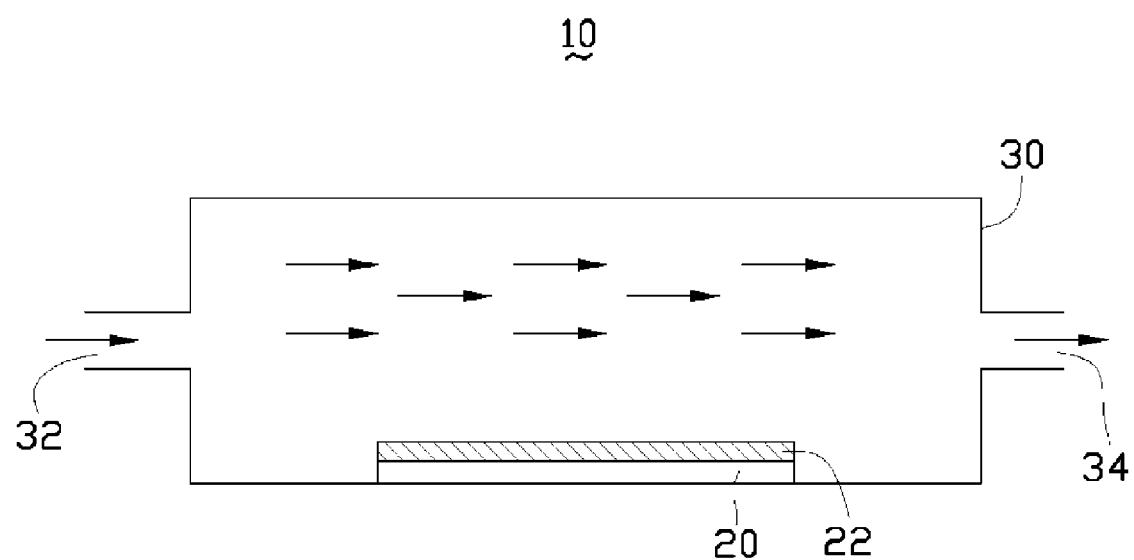
FIG. 4 is a schematic cross-sectional view of a typical apparatus for manufacturing carbon nanotubes.

The gas guiding member 80 has a gas-exiting portion 82 and a pipe 84. In a first embodiment, the gas-exiting portion 82 is an inverted conical portion as shown in FIG. 2A. Alternately, the gas-exiting portion 82 could have other shapes, i.e., substantially cylindrical in a second embodiment or hemispherical in a third embodiment, as shown in FIG. 2B and FIG. 2C respectively. The gas-exiting portion 82 has a cavity 821 defined therein and a flat perforated top wall 822. The cavity 821 has an opening 820 coupled to the pipe 84. The perforated top wall 822 has a plurality of through holes 824 defined therein as shown in FIG. 3. The bottom surface of the substrate 50 is positioned on and in contact with the perforated top wall 822. Thus, the substrate 50 and the perforated top wall 822 are substantially perpendicular to each of the said two sidewalls of the reaction chamber 60 having inlet 62 and outlet 64 therein respectively. The pipe 84 has a first end 842 coupled to the inlet 62 and a second end 844 coupled to the cavity 821 via the opening 820.

A method for manufacturing carbon nanotubes by the above-mentioned apparatus includes the steps in no particular order of:

(1) placing a substrate 50 with a catalyst layer 52 formed thereon into a reaction chamber 60;
(2) introducing a carrier gas into the reaction chamber 60;
(3) heating the reaction chamber 60 to a predetermined temperature;
(4) introducing a carbon-containing gas into the reaction chamber 60 and directing the carbon-containing gas to flow toward the substrate 50 along a direction that is substantially perpendicular to a main plane of the substrate 50.

In step (1), the substrate 50 with a catalyst layer 52 formed thereon is placed in the reaction chamber 60 and disposed on the flat perforated top wall 824 of the gas guiding member 80.

In step (2), a carrier gas is introduced into the reaction chamber 60 by inlet 62. The carrier gas is selected from the group consisting of hydrogen gas, nitrogen gas, ammonia gas, and other similarly inert gases.

In step (3), the reaction chamber 60 is heated to a predetermined temperature by the heater 70. Specifically, the predetermined temperature is in a range from 500° C. to 900° C.

In step (4), the carbon-containing gas is introduced to the inlet 62 for a certain time so as to grow carbon nanotubes on the substrate 50. The carbon-containing gas introduced to the inlet 62 is flowed successively passing through the pipe 84, the gas-exiting portion 82 and finally discharged into the reaction chamber 60 via through holes 824. Therefore, the flow of the carbon-containing gas is substantially perpendicular to the too surface, i.e., a main plane of the substrate 50. Additionally, a flowing direction the carbon-containing gas in the inlet 62 is substantially perpendicular to that in the main piano of the substrate 50. The carbon-containing gas can be a hydrocarbon gas, e.g., methane, ethane, ethylene, acetylene.

During the above-described process of manufacturing carbon nanotubes, the moving direction of the flow of carbon-containing gas is generally perpendicular to a main plane of the substrate, and is thus greatly advantageous for the vertical growth of carbon nanotubes. So the apparatus provided in the exemplary embodiment can be used to manufacture carbon nanotubes with high vertically oriented alignment.

While this invention has been described as having a preferred design, the present invention can be further modified within the spirit and scope of this disclosure. This application is therefore intended to cover any variations, uses, or adaptations of the invention using its general principles. Furthermore, this application is intended to cover such departures from the present disclosure as come within known or customary practice in the art to which this invention pertains and which fall within the limits of the appended claims.

What is claimed is:

1. An apparatus for manufacturing carbon nanotubes, the apparatus comprising:
a reaction chamber having an inlet and an outlet;
a heater for elevating an interior temperature of the reaction chamber;
a substrate for growing carbon nanotubes; and
a gas guiding member coupled to the inlet and configured for introducing a carbon-containing gas into the reaction chamber, the gas guiding member including a gas-exiting portion arranged in the reaction chamber, the gas-exiting portion having a cavity defined therein and a flat perforated top wall, the substrate being disposed on and in contact with the perforated top wall, the perforated top wall defining a route allowing the introduced carbon-containing gas to flow in a direction substantially perpendicular to a main plane of the substrate.

2. The apparatus for manufacturing carbon nanotubes according to claim 1, wherein the gas guiding member is received in the reaction chamber.

3. The apparatus for manufacturing carbon nanotubes according to claim 2, wherein the gas guiding member comprises a pipe having a first end coupled to the inlet and a second end coupled to the cavity of the gas-exiting portion.

4. The apparatus for manufacturing carbon nanotubes according to claim 3, wherein the gas-exiting portion has a shape selected from a group consisting of substantially conical, cylindrical and hemispheric.

5. The apparatus for manufacturing carbon nanotubes according to claim 1, wherein the heater is disposed outside of the reaction chamber.

6. The apparatus for manufacturing carbon nanotubes according to claim 1, wherein a flow direction of the carbon-containing gas in the inlet is substantially perpendicular to that in the main plane of the substrate.

7. The apparatus for manufacturing carbon nanotubes according to claim 6, wherein the inlet is defined in a sidewall of the reaction chamber, the outlet is defined in another sidewall of the reaction chamber spatially opposite to the inlet, and the perforated top wall is substantially perpendicular to said two sidewalls.

8. The apparatus for manufacturing carbon nanotubes according to claim 1, wherein the substrate comprising a catalyst layer formed on a top surface thereof.

9. The apparatus for manufacturing carbon nanotubes according to claim 8, wherein the catalyst layer is a material selected from the group consisting of cobalt, nickel, iron, and alloys based on cobalt nickel, or iron.

10. The apparatus for manufacturing carbon nanotubes according to claim 9, wherein the substrate is a material selected from the group consisting of quartz, silicon, and magnesium oxide.

11. The apparatus for manufacturing carbon nanotubes according to claim 1, wherein the substrate is positioned in an upper portion of the reaction chamber, and the gas guiding member is positioned at a lower portion of the reaction chamber.

* * * * *